United States Patent
Yamamoto

[11] Patent Number: 6,002,460
[45] Date of Patent: Dec. 14, 1999

[54] ELECTRICALLY CONDUCTIVE NON-GLARE POLARIZING PLATE

[75] Inventor: Yuji Yamamoto, Tokyo, Japan

[73] Assignee: NEC Corporation, Japan

[21] Appl. No.: 09/028,926

[22] Filed: Feb. 24, 1998

[30] Foreign Application Priority Data

Feb. 25, 1997 [JP] Japan .................................. 9-040698

[51] Int. Cl.[6] .............................. G02F 1/1335; G02B 5/30
[52] U.S. Cl. .............................. 349/96; 359/483; 349/162
[58] Field of Search ..................................... 359/437, 483, 359/494; 349/96, 162, 112, 137

[56] References Cited

U.S. PATENT DOCUMENTS

| 4,945,282 | 7/1990 | Kawamura et al. ............ 313/479 |
| 5,237,439 | 8/1993 | Misono et al. ............ 349/122 |
| 5,292,568 | 3/1994 | Tezuka et al. ............ 428/64 |
| 5,520,852 | 5/1996 | Ikkala et al. ............ 252/519.21 |
| 5,534,748 | 7/1996 | Oomen ............ 313/479 |
| 5,759,643 | 6/1998 | Miyahsita et al. ............ 428/1 |
| 5,773,126 | 6/1998 | Noritake et al. ............ 428/143 |
| 5,783,299 | 7/1998 | Miyashita et al. ............ 428/329 |

FOREIGN PATENT DOCUMENTS

| 61-168899 | 7/1986 | Japan . |
| 4-342202 | 11/1992 | Japan . |
| 6-139822 | 5/1994 | Japan . |
| 6-196110 | 7/1994 | Japan . |
| 6-324214 | 11/1994 | Japan . |

Primary Examiner—William L. Sikes
Assistant Examiner—Heidi L. Eisenhut
Attorney, Agent, or Firm—Ostrolenk, Faber, Gerb & Soffen, LLP

[57] ABSTRACT

There is provided a polarizing plate including (a) upper and lower substrates both composed of transparent material, (b) a liquid crystal layer sandwiched between the upper and lower substrates, (c) a pair of adhesive layers formed on the upper and lower substrates, respectively, (d) first hard coat layers adhered to the upper and lower substrates, respectively, through the adhesive layers, (e) polarizing layers formed on the first hard coat layers, respectively, (f) a second hard coat layer formed on one of the polarizing layers, and (g) an electrically conductive layer having glare shield function and formed on the other of the polarizing layers. For instance, the electrically conductive layer is composed of a resin in which electrically conductive particles composed of $In_2O_3$, $SnO_2$, or a mixture of $In_2O_3$ and $SnO_2$ are scattered. The above-mentioned polarizing plate can have an electrically conductive, non-glare layer without carrying out additional steps such as vacuum evaporation or sputtering.

19 Claims, 5 Drawing Sheets

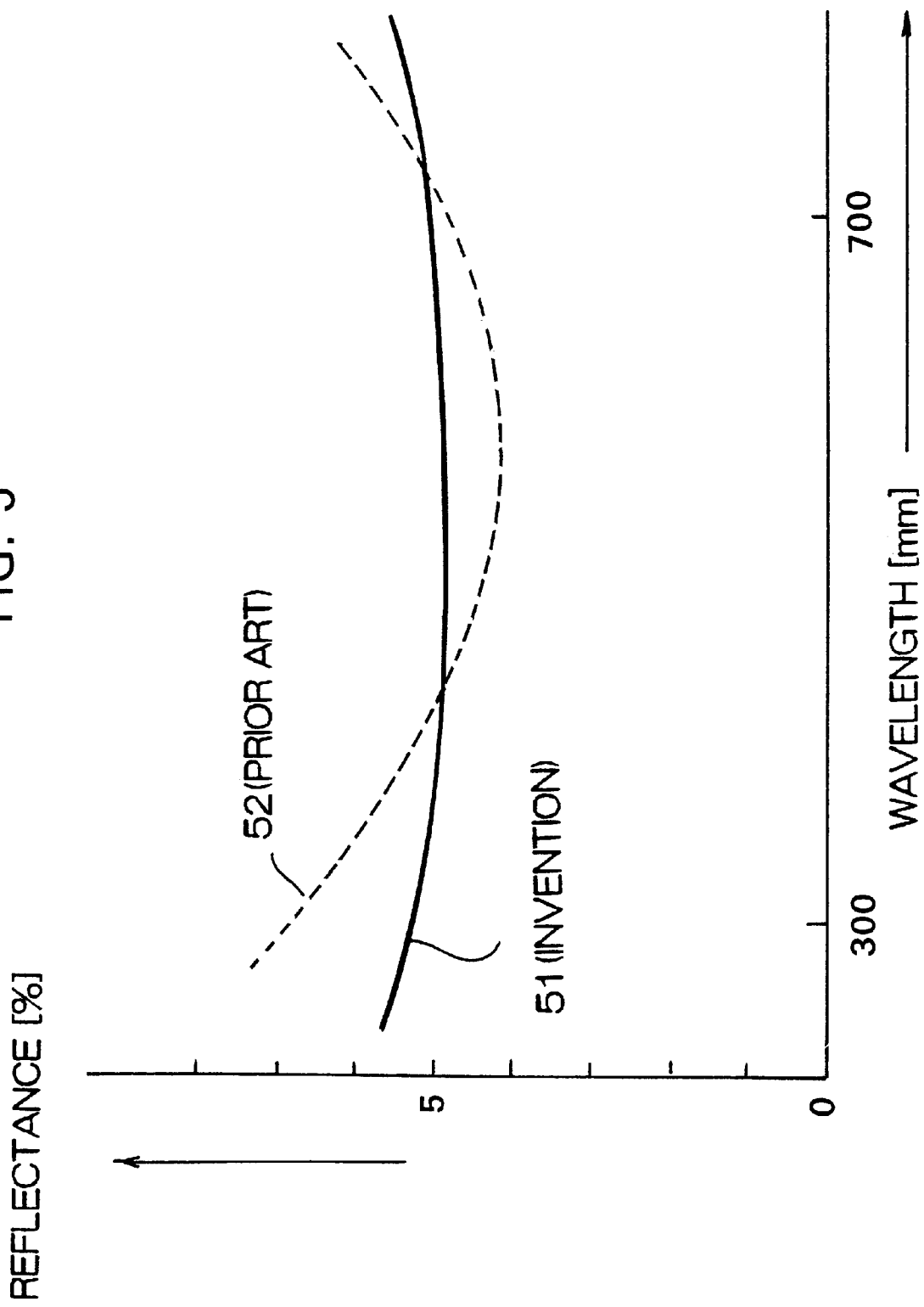

ELECTRICALLY CONDUCTIVE NON-GLARE POLARIZING PLATE

BACKGROUND OF THE INVENTION

1. Field of the Invention

The invention relates to a polarizing plate to be used for a liquid crystal display, and more particularly to a polarizing plate having glare shield effect and electrical conductivity.

2. Description of the Related Art

In a conventional twist nematic (TN) liquid crystal display, an electric field is applied perpendicularly to a glass substrate to thereby cause liquid crystal molecules to stand perpendicularly to a panel, and images are displayed utilizing variation in light transmittance of the panel which occurs when the liquid crystal molecules are caused to stand perpendicularly to the panel. A polarizing plate generally used in such a conventional TN liquid crystal display is constituted of a pair of acrylic films, and a polarizing film sandwiched between the acrylic films. One of the acrylic films is adhered to a panel of a polarizing plate through acrylic adhesive, and a glare shield layer is formed on the other of the acrylic films adhered to a display surface. The glare shield layer is designed to have irregularities at a surface thereof, or be composed of acrylic resin in which $SiO_2$ particles are scattered, and the $SiO_2$ particles are fixated by being optically or thermally cured. The glare shield layer is formed for the purpose of scattering reflection lights to thereby reduce glare caused by reflection of external lights. The glare shield layer enhances visibility in display in a TN liquid crystal display.

TN liquid crystal display is employed in variety of fields because it consumes less power, is more compact, and provides better quality than other displays such as cathode ray tube (CRT). However, since crystal liquid molecules are driven perpendicularly to a panel, a viewer sees the crystal liquid molecules in different directions in dependence on an angle with which the viewer observes the panel. Since an angle of visibility, defined as an angle at which contrast is inverted, in crystal liquid molecules is quite narrow because of anisotropy in a refractive index thereof, TN liquid crystal display is not suitable to a big screen at which many viewers looks in all directions.

In these days, with development in technology for fabricating a thin film transistor (TFT) in a quite small size, a horizontal electric field type liquid crystal display which has an angle of visibility sufficiently wide to use for a big screen such as a monitor, has been put to practical use. A horizontal electric field type liquid crystal display displays images thereon, utilizing variation in light transmittance of a panel which takes place when a voltage is applied in parallel with a panel to thereby rotate liquid crystal molecules in the panel. Hence, a viewer can look at crystal liquid molecules in a common direction regardless of an angle with which the viewer looks at a panel. Thus, a horizontal electric field type liquid crystal display has almost no dependence on an angle of visibility, and has an angle of visibility as wide as an angle of visibility of CRT. A horizontal electric field type liquid crystal display is expected to take over CRT.

A polarizing plate used in a horizontal electric field type liquid crystal display has a glare shield layer on a surface thereof for enhancing visibility similarly to TN liquid crystal display. However, a horizontal electric field type liquid crystal display is accompanied with a problem that when electric charges such as static electricity are accumulated on a surface of the liquid crystal display, and the electric charges have no space to escape to, an electric field is generated perpendicularly to a panel. The thus generated perpendicular electric field puts out of order an electric field applied to liquid crystal molecules both when crystal liquid molecules are driven or not driven. As a result, crystal liquid molecules behave independently of signals transmitted thereto, and accordingly the quality of display is considerably deteriorated.

As a solution to the above-mentioned problem, a horizontal electric field type liquid crystal display has been designed to have an electrically conductive polarizing plate not only for preventing from being charged, but also for providing glare shield effect.

FIG. 1 illustrates a conventional, electrically conductive polarizing plate not only for preventing from being charged, but also for providing glare shield effect. The illustrated polarizing panel is used in a liquid crystal panel. The liquid crystal panel includes an upper glass substrate 38, a lower glass substrate 40, and a liquid crystal layer 39 sandwiched between the upper and lower glass substrates 38 and 40. A first polarizing plate includes a pair of transparent hard coat layers 43 and 44, a polarizing layer 41 sandwiched between the transparent hard coat layers 43 and 44, a glare shield layer 49 formed on the transparent hard coat layer 43, and a thin, electrically conductive film 50 formed on the glare shield layer 49. The first polarizing plate is adhered to the upper glass substrate 38 through an acrylic adhesive layer 47. A second polarizing plate includes a pair of transparent hard coat layers 45 and 46, and a polarizing layer 42 sandwiched between the transparent hard coat layers 45 and 46, and is adhered to the lower glass substrate 40 through an acrylic adhesive layer 48.

Since no electric charges are accumulated on the first polarizing plate having electrical conductivity, no electric field is generated perpendicularly to a panel, and thus it is possible to prevent deterioration of the quality of display. A polarizing plate having both an electrically conductive film and a glare shield layer, as mentioned above, has been suggested in Japanese Unexamined Patent Publications Nos. 6-324214, 6-139822, 6-196110, 61-168899, and 4-342202. However, the polarizing plates having been suggested in those Publications are accompanied with a problem which occurs when an electrically conductive film is formed.

Japanese Unexamined Patent Publications Nos. 6-324214 and 61-168899 have suggested methods of forming an electrically conductive film by evaporating electrically conductive material in vacuum. However, the suggested methods have to include an extra step of vacuum evaporation, resulting in an increase in cost for fabricating a polarizing plate. In addition, these methods use an electrically conductive, thin film. Hence, a light interference of external lights reflected from the thin film varies in dependence on a thickness of the thin film with the result that the reflected lights are colored, which considerably deteriorate quality of display.

Japanese Unexamined Patent Publications Nos. 6-139822 and 6-196110 have suggested methods of fixating electrically conductive material by burning in order to have an electrically conductive film. However, it is necessary in both the methods to burn an electrically conductive film at 100° C. or greater in order to fixate the film. Namely, a polarizing plate has to be treated at a temperature greater than a maximum temperature at which the polarizing plate can withstand. Hence, these methods are not suitable for forming an electrically conductive film to be used for a polarizing plate.

Japanese Unexamined Patent Publication No. 4-342202 has suggested a method of forming irregularities on a surface of a polarizing plate for reducing reflection at the surface. The irregularities are formed by applying energy such as ultra-violet ray and heat to a base resin, scattering resin, which is cured in a different atmosphere, in a surface of a polarizing plate and then curing the resin to thereby use irregularities of the cured resin, and so on. However, this method has to have an extra step of forming irregularities, resulting in an increase in cost for fabricating a polarizing plate.

In brief, the above-mentioned prior art has the following problems.

The first problem is that external lights reflected from a surface of an electrically conductive film cause light interference in dependence on a thickness of the electrically conductive film, resulting in that the reflected lights are colored. This is because the electrically conductive film is formed as a thin film by vacuum vaporation and so on.

The second problem is that it is necessary in the prior art to carry out an extra step for forming an electrically conductive film with the result of an increase in fabrication cost of a polarizing plate. This is because a step of forming an electrically conductive film is a step additional to usual fabrication steps of fabricating a polarizing plate.

SUMMARY OF THE INVENTION

In view of the foregoing problems of the prior art, it is an object of the present invention to provide a polarizing plate which has glare shield function and electrical conductivity, a light reflected from a surface of which is not colored, and which can be formed without addition of any extra steps.

There is provided a polarizing plate having a single layer formed at a surface thereof and having electrical conductivity and glare shield function.

For instance, the layer may be composed of a resin in which electrically conductive particles composed of $In_2O_3$, $SnO_2$, or a mixture of $In_2O_3$ and $SnO_2$ are scattered. It is preferable that the particles have a diameter in the range of 0.1 $\mu$m to 5 $\mu$m both inclusive. It is also preferable that the particles are in the range of 50 wt % to 95 wt % both inclusive on the basis of weight of all solid materials. It is further preferable that the layer is designed to have a surface resistance in the range of $10^7$ $\Omega$ per a unit area to $10^{10}$ $\Omega$ per a unit area For instance, the resin may be acrylic resin. The resin is preferably of type of being optically or thermally cured to thereby fixate the particles.

The polarizing plate may further include a protection layer formed on the layer for preventing the layer from being contaminated. For instance, the protection layer may be composed of silane fluoride compound.

There is further provided a polarizing plate including (a) upper and lower substrates both composed of transparent material, (b) a liquid crystal layer sandwiched between the upper and lower substrates, (c) a pair of adhesive layers formed on the upper and lower substrates, respectively, (d) first hard coat layers adhered to the upper and lower substrates, respectively, through the adhesive layers, (e) polarizing layers formed on the first hard coat layers, respectively, (f) a second hard coat layer formed on one of the polarizing layers, and (g) an electrically conductive layer having glare shield function and formed on the other of the polarizing layers.

The above-mentioned polarizing plate may further include an additional second hard coat layer sandwiched between the other of the polarizing layers and the electrically conductive layer.

In accordance with the present invention, a polarizing plate includes an acrylic resin layer formed on a surface thereof. Electrically conductive particles, $In_2O_3$, $SnO_2$, or a mixture of $In_2O_3$ and $SnO_2$ (hereinafter, "$In_2O_3$, $SnO_2$, or a mixture of $In_2O_3$ and $SnO_2$" is referred to simply as "ITO") are scattered in the acrylic resin layer, and are fixated by optically or thermally curing the acrylic resin. Hence, it is no longer necessary to form an electrically conductive, thin film for providing the polarizing plate with electrical conductivity. Accordingly, lights reflected from a surface of the polarizing plate are not colored. In addition, since ITO particles having a relatively great refractive index, specifically about 2, are scattered at a surface of the polarizing plate, external lights incident on the polarizing plate are all scattered and reflected, which ensures glare shield effect.

Furthermore, since acrylic resin in which electrically conductive particles of ITO are scattered is applied to a surface of a polarizing plate, it is not necessary to prepare a vacuum evaporation equipment in order to provide the polarizing plate with electrical conductivity. It is possible to still use apparatuses or steps for scattering $SiO_2$ in acrylic resin, applying the acrylic resin onto a surface of a polarizing film, and optically or thermally cure the acrylic resin, to thereby provide the polarizing plate with glare shield function. A polarizing plate in accordance with the present invention can be fabricated without changing conventional steps of fabricating a polarizing plate, and thus it is possible to avoid an increase in cost for fabricating a polarizing plate.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 5 is a graph showing a relation between a refractive index and wavelength in both a conventional polarizing plate and a polarizing plate in accordance with the present invention.

DESCRIPTION OF THE PREFERRED EMBODIMENTS

[First Embodiment]

Figure 1:
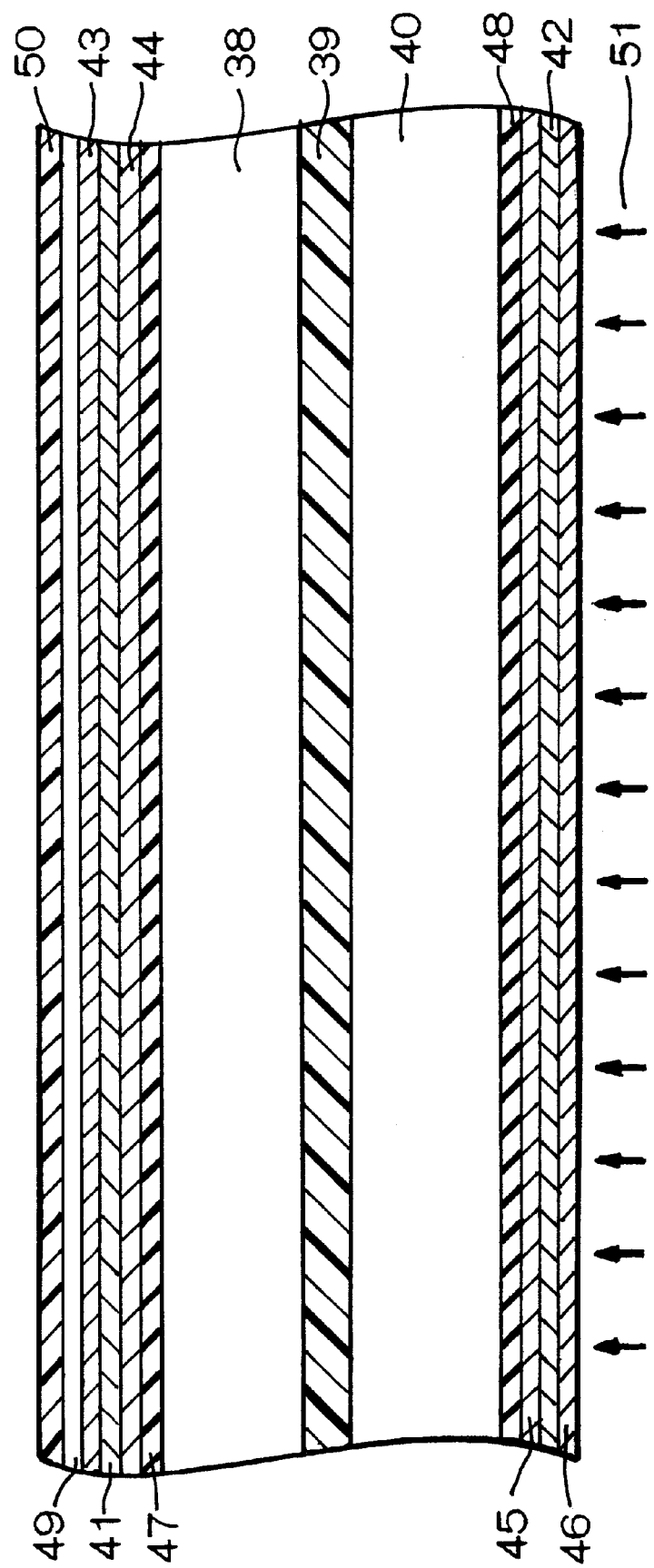
FIG. 1 is a cross-sectional view of a conventional polarizing plate.
Figure 2:
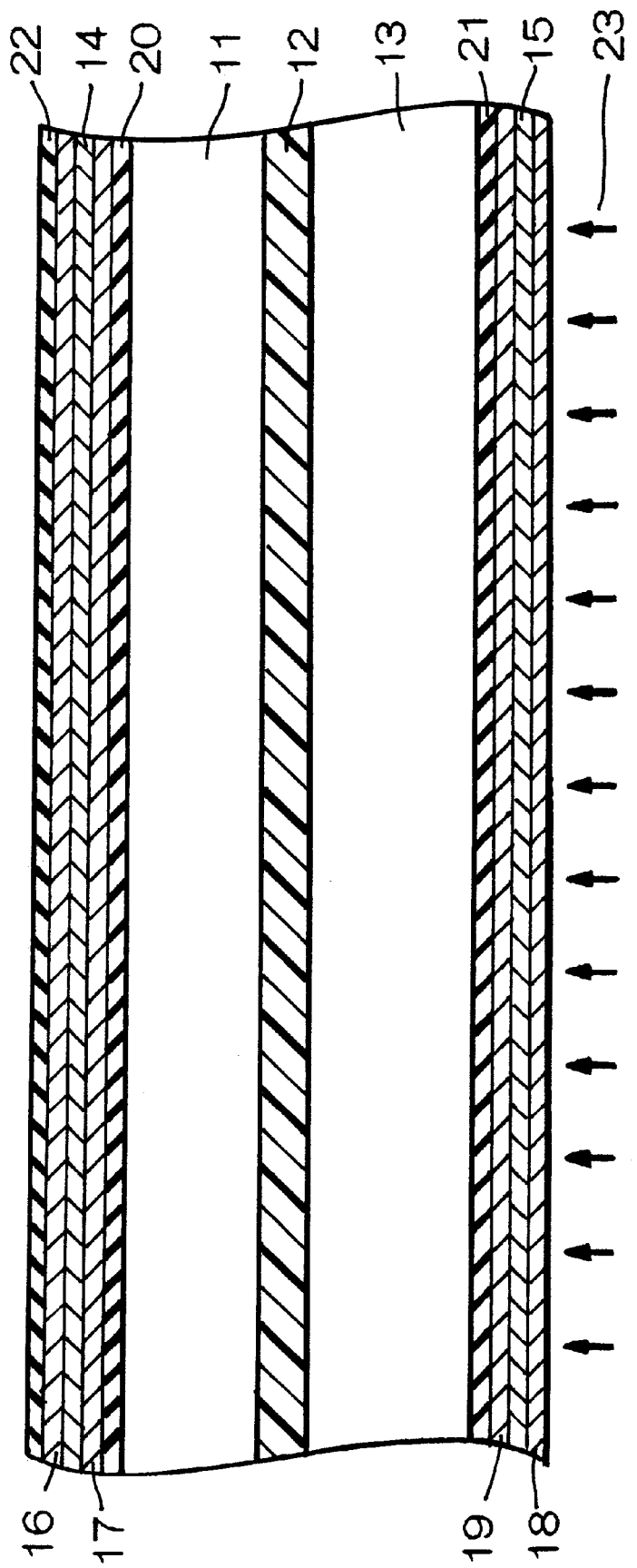
FIG. 2 is a cross-sectional view of a polarizing plate in accordance with the first embodiment of the present invention.

FIG. 2 illustrates a polarizing plate in accordance with the first embodiment. The illustrated polarizing plate includes an upper glass substrate 11 disposed at a side of a display surface, a lower glass substrate 13, a liquid crystal layer 12 sandwiched between the upper and lower glass substrates 11 and 13, first and second transparent hard coat layers 17 and 16, a first polarizing layer 14 sandwiched between the first and second transparent hard coat layers 17 and 16, an acrylic adhesive layer 20 adhering the first transparent hard coat layer 17 to the upper glass substrate 11, an electrically conductive layer 22 formed on the second transparent hard coat layer 16, third and fourth hard coat layers 19 and 18, a second polarizing layer 15 sandwiched between the third and fourth hard coat layers 19 and 18, and an acrylic adhesive layer 21 adhering the third hard coat layer 19 to the lower glass substrate 13.

The electrically conductive layer 22 has glare shield function, and is composed of acrylic resin containing ITO particles scattered therein at 50 wt % to 95 wt % based on a weight of total solid material. ITO particles have a diameter in the range of 0.1 μm to 5 μm.

Hereinbelow is explained an operation of the above-mentioned polarizing plate. A back light 23 passes through the second polarizing layer 15 having polarizing function, and as a result, only components along a polarization axis in the back light 23 reach the liquid crystal layer 12. Liquid crystal molecules in the liquid crystal layer 12 are oriented in the same direction as or in a 90 degrees-rotated direction from a polarization axis in the second polarizing layer 15 when no voltage is applied to the liquid crystal molecules. On the other hand, a polarizing axis in the first polarizing layer 14 is 90 degrees rotated from a polarizing axis in the second polarizing layer 15. Thus, the liquid crystal molecules in the liquid crystal layer 12 cooperate with the first polarizing layer 14 to thereby shield the back light 23 having been passed through the second polarizing layer 15.

If a voltage is applied to the liquid crystal layer 12 to thereby rotate the liquid crystal molecules in the liquid crystal layer 12, the back light 23 which has become linearly polarized light by passing through the second polarizing layer 15 becomes elliptically polarized light in the liquid crystal layer 12. Thus, the back light 23 can pass through both the liquid crystal layer 12 and the first polarizing layer 14 at an intensity defined in accordance with the voltage applied to the liquid crystal layer 12. That is, it is possible to control an intensity of light transmission in accordance with a voltage applied to the liquid crystal layer 12.

The electrically conductive layer 22 rapidly scatters electric charges electric charges having been accumulated on a surface thereof, and resultingly does not allow an electric field, which is not necessary for operation of a panel and will deteriorate the quality of display, to be generated perpendicularly to a panel to thereby maintain the quality of panel display.

In addition, since ITO particles disposed at a surface of the polarizing plate in scattered condition have a relatively great refractive index, specifically about 2, ITO particles scatter and reflect lights incident thereon, and thus prevent glare caused by reflection of the reflected lights in the electrically conductive layer 22.

Furthermore, since the polarizing plate does not have a thin film as an outermost layer, the reflected lights do not cause light interference. As a result, there does scarcely occur dispersion in wavelength in spectrum of the reflected light, and accordingly, the reflected lights are not colored.

[Second Embodiment]

Figure 3:
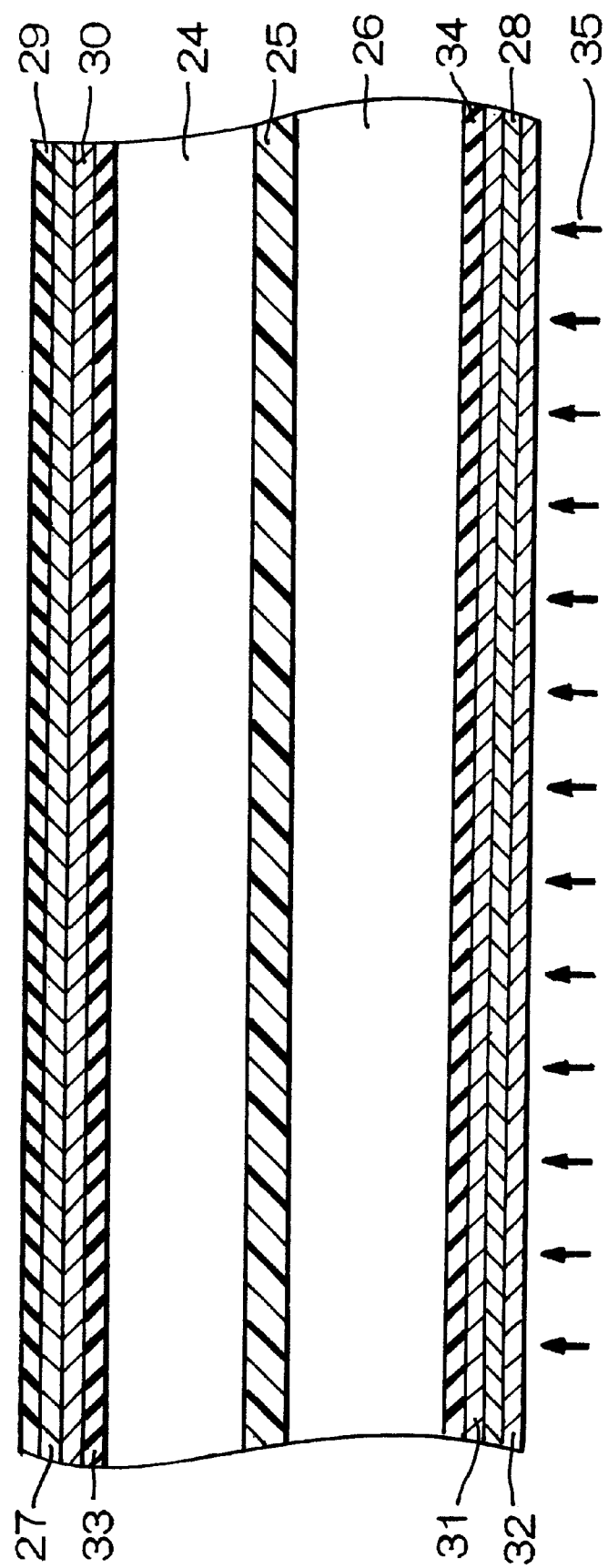
FIG. 3 is a cross-sectional view of a polarizing plate in accordance with the second embodiment of the present invention.

FIG. 3 illustrates a polarizing plate in accordance with the second embodiment. The illustrated polarizing plate includes an upper glass substrate 24 disposed at a side of a display surface, a lower glass substrate 26, a liquid crystal layer 25 sandwiched between the upper and lower glass substrates 24 and 26, a first transparent hard coat layer 30, a first polarizing layer 27 formed on the first transparent hard coat layer 30, an acrylic adhesive layer 33 adhering the first transparent hard coat layer 30 to the upper glass substrate 24, an electrically conductive layer 29 formed on the first polarizing layer 27, second and third transparent hard coat layers 31 and 32, a second polarizing layer 28 sandwiched between the second and third transparent hard coat layers 31 and 33, and an acrylic adhesive layer 34 adhering the second transparent hard coat layer 31 to the lower glass substrate 26.

The electrically conductive layer 29 has glare shield function, and is composed of acrylic resin containing ITO particles scattered therein at 50 wt % to 95 wt % based on a weight of total solid material. ITO particles have a diameter in the range of 0.1 μm to 5 μm.

The polarizing plate illustrated in FIG. 3 in accordance with the second embodiment is structurally different from the first embodiment illustrated in FIG. 2 in that the polarizing plate in accordance with the second embodiment does not have a transparent hard coat layer corresponding to the second transparent hard coat layer 16 in the first embodiment. However, the electrically conductive layer 29 doubles as a transparent hard coat layer.

Hereinbelow is explained an operation of the above-mentioned polarizing plate in accordance with the second embodiment. A back light 35 passes through the second polarizing layer 28 having polarizing function, and as a result, only components along a polarization axis in the back light 35 reach the liquid crystal layer 25. Liquid crystal molecules in the liquid crystal layer 25 are oriented in the same direction as or in a 90 degrees-rotated direction from a polarization axis in the second polarizing layer 28 when no voltage is applied to the liquid crystal molecules. On the other hand, a polarizing axis in the first polarizing layer 27 is rotated by 90 degrees from a polarizing axis in the second polarizing layer 28. Thus, the liquid crystal molecules in the liquid crystal layer 25 cooperate with the first polarizing layer 27 to thereby shield the back light 35 having been passed through the second polarizing layer 28.

If a voltage is applied to the liquid crystal layer 25 to thereby rotate the liquid crystal molecules in the liquid crystal layer 25, the back light 35 which has become linearly polarized light by passing through the second polarizing layer 28 becomes elliptically polarized light in the liquid crystal layer 25. Thus, the back light 35 can pass through both the liquid crystal layer 25 and the first polarizing layer 27 at an intensity defined in accordance with the voltage applied to the liquid crystal layer 25. That is, it is possible to control an intensity of light transmission in accordance with a voltage applied to the liquid crystal layer 25.

The electrically conductive layer 29 rapidly scatters electric charges electric charges having been accumulated on a surface thereof, and resultingly does not allow an electric field, which is not necessary for operation of a panel and will deteriorate the quality of display, to be generated perpendicularly to a panel to thereby maintain the quality of panel display.

In addition, since ITO particles disposed at a surface of the polarizing plate in scattered condition have a relatively great refractive index, specifically about 2, ITO particles scatter and reflect lights incident thereon, and thus prevent glare caused by reflection of the reflected lights in the electrically conductive layer 29.

Furthermore, since the polarizing plate does not have a thin film as an outermost layer, the reflected lights do not cause light interference. As a result, there does scarcely occur dispersion in wavelength in spectrum of the reflected light, and accordingly, the reflected lights are not colored.

[Third Embodiment]

Figure 4:
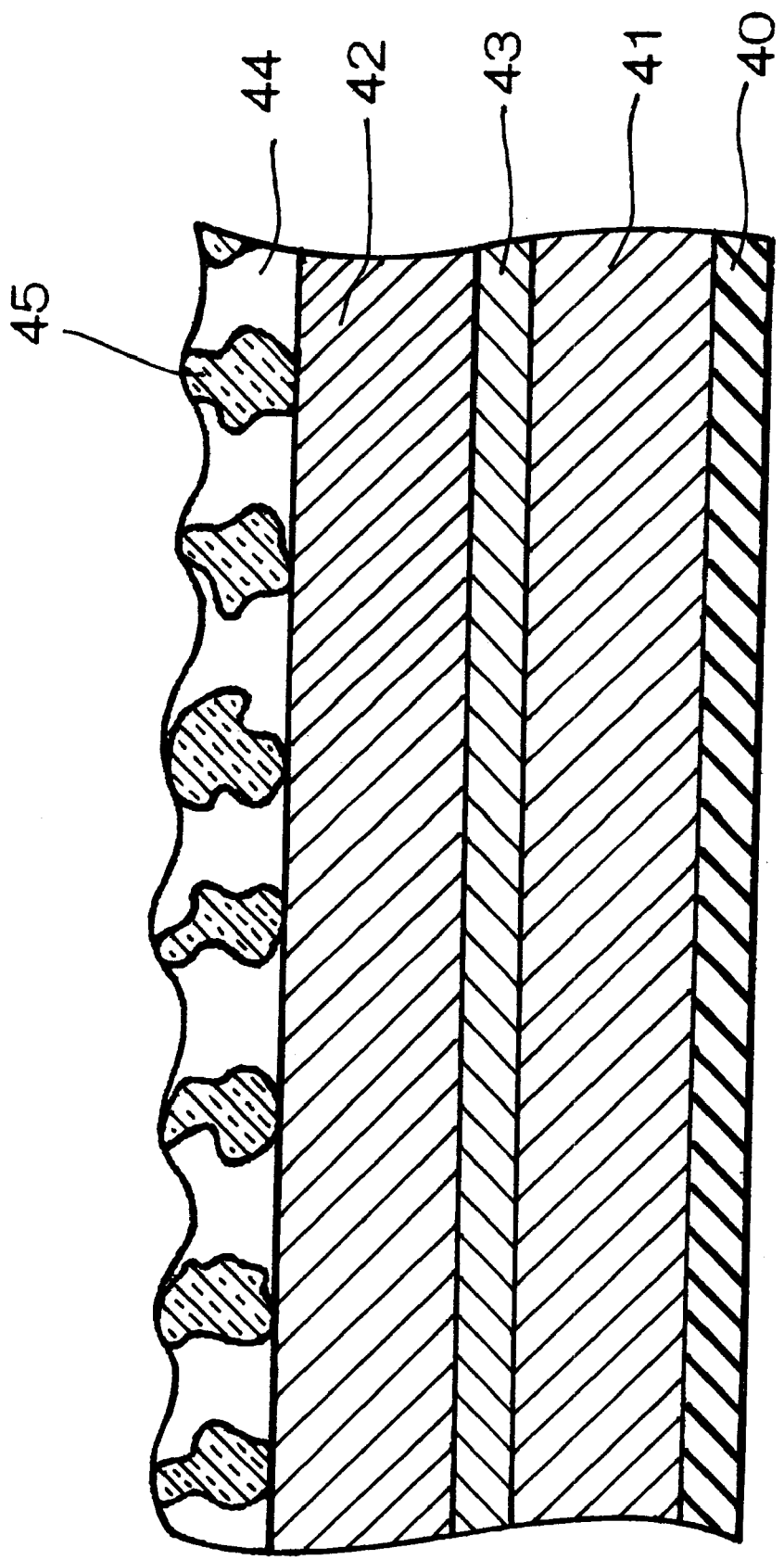
FIG. 4 is a cross-sectional view of a polarizing plate in accordance with the third embodiment of the present invention.

FIG. 4 illustrates a part of a polarizing plate in accordance with the third embodiment. The illustrated polarizing plate includes a liquid crystal layer 40, a first transparent hard coat layer 41 formed on the liquid crystal layer 40, a second transparent hard coat layer 42 formed above the first transparent hard coat layer 41, a polarizing layer 43 sandwiched between the first and second transparent hard coat layers 41 and 42, and an acrylic resin layer 44 formed on the second transparent hard coat layer 42. The acrylic resin layer 44 contains ITO particles 45 scattered therein at 75 wt % based on a weight of total solid material. ITO particles 45 have a diameter of 1 μm. The acrylic resin layer 44 has glare shield function and electrical conductivity.

Hereinbelow is explained an operation of the polarizing plate in accordance with the third embodiment. ITO particles 45 scattered at a surface of the polarizing plate allows the polarizing plate to have a surface resistance of about $8 \times 10^8$ Ω per a unit area. This electrical conductivity applied to a surface of the polarizing plate rapidly scatters electric charges having been accumulated on a surface of the polarizing plate. Accordingly, there is not generated a vertical electric field which is not necessary for liquid crystal operation, resulting in that the quality of display can be uniformly maintained. In addition, since ITO particles 45 scattered in the acrylic resin layer 44 scatter externally coming reflected lights, which ensures reduction in the glare caused by the reflected lights.

FIG. 5 is a graph illustrating spectrum 51 of reflected lights in a polarizing plate in accordance with the third embodiment in comparison with spectrum 52 of reflected lights in a conventional polarizing plate having a thin film formed on a surface thereof in order to provide electrical conductivity to the polarizing plate. As is obvious in FIG. 5, the spectrum 52 of reflected lights in a conventional polarizing plate has an extremal value in a visible light band, and hence the reflected lights are colored. On the other hand, since the polarizing plate in accordance with the present invention does not have a thin film at a surface thereof, and hence lights reflected at a surface of the polarizing plate do not cause light interference, dispersion in wavelength does scarcely occurs in the spectrum 51 of reflected lights in the inventive polarizing plate. That is, the spectrum 51 of reflected lights in the polarizing plate in accordance with the present invention is substantially flat in a visible light band, and hence the reflected lights are not colored.

The above-mentioned polarizing plate in accordance with the first, second and third embodiments may further include an additional layer (not illustrated) on the electrically conductive layers 22 and 29 or the acrylic resin layer 44 as an outermost layer. This additional layer is formed for the purpose of preventing the electrically conductive layers 22 and 29 or the acrylic resin layer 44 from being contaminated with dusts and so on in the atmosphere. For instance, the additional layer may be composed of silane fluoride compound.

As having been described in connection with the preferred embodiments, the present invention provides advantages as follows.

Firstly, it is now possible to omit an extra step of forming an electrically conductive layer, such as vacuum evaporation and sputtering. Thus, the present invention makes it possible to form a polarizing plate having electrical conductivity at lower costs than conventional polarizing plates. The reason is that ITO particles which are applied to the polarizing plate for adding glare shield effect to the polarizing plate have electrical conductivity, and accordingly the polarizing plate can have electrical conductivity without increasing additional steps.

Secondly, the polarizing plate in accordance with the present invention does not use a thin film layer of which an electrically conductive layer is formed. This prevents lights reflected from a surface of the polarizing plate from being colored, which considerably enhances visibility of a panel.

The reason is as follows. As mentioned earlier, interference among reflected lights occurs at a thin film layer formed at an outer surface of a polarizing plate. Since the polarizing plate in accordance with the present invention does not include a thin film layer, the interference does not occur, which ensures that dispersion in wavelength does scarcely occurs in spectrum of reflected lights, and hence the spectrum is almost flat in visible light band.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-40698 filed on Feb. 25, 1997 including specification, claims, drawings and summary is incorporated herein by reference in its entirety.

What is claimed is:

1. A polarizing plate comprising a single layer formed on a surface of a substrate having a polarizing function, the single layer having electrical conductivity and glare shield function, said single layer comprising a resin in which electrically conductive particles are scattered.

2. A polarizing plate comprising a single layer formed on a surface of a substrate having a polarizing function, the single layer having electrical conductivity and glare shield function, wherein said layer comprises a resin in which electrically conductive particles comprising a material selected from a group consisting of $In_2O_3$, $SnO_2$, and a mixture of $In_2O_3$ and $SnO_2$ are scattered.

3. A polarizing plate comprising a single layer formed on a surface of a substrate having a polarizing function, the single layer having electrical conductivity and glare shield function, wherein said layer comprises a resin in which electrically conductive particles comprising a material selected from a group consisting of $In_2O_3$, $SnO_2$, and a mixture of $In_2O_3$ and $SnO_2$ are scattered, wherein said particles have a diameter in the range of 0.1 μm to 5 μm both inclusive.

4. The polarizing plate as set forth in claim 2, wherein said particles are in the range of 50 wt % to 95 wt % both inclusive on the basis of weight of all solid materials.

5. The polarizing plate as set forth in claim 2, wherein said layer is designed to have a surface resistance in the range of $10^7$ Ω per a unit area to $10^{10}$ Ω per a unit area.

6. A polarizing plate comprising a single layer formed on a surface of a substrate having a polarizing function, the single layer having electrical conductivity and glare shield function, wherein said layer comprises a resin in which electrically conductive particles comprising a material selected from a group consisting of $In_2O_3$, $SnO_2$, and a mixture of $In_2O_3$ and $SnO_2$ are scattered, wherein said resin is acrylic resin.

7. The polarizing plate as set forth in claim 2, wherein said resin is optically or thermally cured to thereby fixate said particles.

8. The polarizing plate as set forth in claim 1, further comprising a protection layer formed on said layer for preventing said layer from being contaminated.

9. The polarizing plate as set forth in claim 8, wherein said protection layer comprises silane fluoride compound.

10. A polarizing plate comprising:
(a) upper and lower substrates both comprising transparent material;
(b) a liquid crystal layer sandwiched between said upper and lower substrates;
(c) a pair of adhesive layers formed on said upper and lower substrates, respectively;
(d) first hard coat layer adhered to said upper and lower substrates, respectively, through said adhesive layers;
(e) polarizing layers formed on said first hard coat layers, respectively;
(f) a second hard coat layer formed on one of said polarizing layers; and
(g) an electrically conductive layer having glare shield function and formed on the other of said polarizing layers, said layer comprising a resin in which electrically conductive particles are scattered.

11. The polarizing plate as set forth in claim 10, further comprising an additional second hard coat layer sandwiched between said other of said polarizing layers and said electrically conductive layer.

12. A polarizing plate comprising:
(a) upper and lower substrates both comprising transparent material;
(b) a liquid crystal layer sandwiched between said upper and lower substrates;
(c) a pair of adhesive layers formed on said upper and lower substrates, respectively;
(d) first hard coat layer adhered to said upper and lower substrates, respectively, through said adhesive layers;
(e) polarizing layers formed on said first hard coat layers, respectively;
(f) a second hard coat layer formed on one of said polarizing layers; and
(g) an electrically conductive layer having glare shield function and formed on the other of said polarizing layers,
wherein said electrically conductive layer (is composed comprises a resin in which electrically conductive particles comprising a material selected from a group consisting of $In_2O_3$, $SnO_2$, and a mixture of $In_2O_3$ and $SnO_2$ are scattered.

13. A polarizing plate comprising:
(a) upper and lower substrates both comprising transparent material;
(b) a liquid crystal layer sandwiched between said upper and lower substrates;
(c) a pair of adhesive layers formed on said upper and lower substrates, respectively;
(d) first hard coat layer adhered to said upper and lower substrates, respectively, through said adhesive layers;
(e) polarizing layers formed on said first hard coat layers, respectively;
(f) a second hard coat layer formed on one of said polarizing layers; and
(g) an electrically conductive layer having glare shield function and formed on the other of said polarizing layers,
wherein said electrically conductive layer comprises a resin in which electrically conductive particles comprising a material selected from a group consisting of $In_2O_3$, $SnO_2$, and a mixture of $In_2O_3$ and $SnO_2$ are scattered, and
wherein said particles have a diameter in the range of 0.1 $\mu$m to 5 $\mu$m both inclusive.

14. The polarizing plate as set forth in claim 12, wherein said particles are in the range of 50 wt % to 95 wt % both inclusive on the basis of weight of all solid materials.

15. The polarizing plate as set forth in claim 12, wherein said electrically conductive layer is designed to have a surface resistance in the range of $10^7$ $\Omega$ per a unit area to $10^{10}$ $\Omega$ per a unit area.

16. A polarizing plate comprising:
(a) upper and lower substrates both comprising transparent material;
(b) a liquid crystal layer sandwiched between said upper and lower substrates;
(c) a pair of adhesive layers formed on said upper and lower substrates, respectively;
(d) first hard coat layer adhered to said upper and lower substrates, respectively, through said adhesive layers;
(e) polarizing layers formed on said first hard coat layers, respectively;
(f) a second hard coat layer formed on one of said polarizing layers; and
(g) an electrically conductive layer having glare shield function and formed on the other of said polarizing layers,
wherein said electrically conductive layer comprises a resin in which electrically conductive particles comprising a material selected from a group consisting of $In_2O_3$, $SnO_2$, and a mixture of $In_2O_3$ and $SnO_2$ are scattered, and
wherein said resin is acrylic resin.

17. The polarizing plate as set forth in claim 12, wherein said resin is optically or thermally cured to thereby fixate said particles.

18. The polarizing plate as set forth in claim 10, further comprising a protection layer formed on said electrically conductive layer for preventing said electrically conductive layer from being contaminated.

19. The polarizing plate as set forth in claim 18, wherein said protection layer comprises silane fluoride compound.

* * * * *